United States Patent [19]

Inoue

[11] Patent Number: 4,639,799
[45] Date of Patent: Jan. 27, 1987

[54] MAGNETIC TAPE RECORDING AND REPRODUCING APPARATUS WITH ROTATABLE DRUM HAVING INCLINED HEADS

[75] Inventor: Osamu Inoue, Yokohama, Japan

[73] Assignee: Victor Company of Japan, Ltd., Yokohama, Japan

[21] Appl. No.: 672,899

[22] Filed: Nov. 19, 1984

[30] Foreign Application Priority Data

Nov. 18, 1983 [JP] Japan .................... 58-178609[U]

[51] Int. Cl.⁴ .................. G11B 15/66; G11B 5/56
[52] U.S. Cl. .................................................. 360/85
[58] Field of Search .................. 360/77, 84, 85, 10.2, 360/10.3

[56] References Cited

U.S. PATENT DOCUMENTS

| | | | |
|---|---|---|---|
| 3,375,331 | 3/1968 | Okazaki et al. | 360/10.2 |
| 3,968,517 | 7/1976 | Chimura et al. | 360/84 |
| 4,035,842 | 7/1977 | Terao et al. | 360/10 |
| 4,080,636 | 3/1978 | Ravizza | 360/77 |
| 4,093,885 | 6/1978 | Brown | 310/331 |
| 4,099,211 | 7/1978 | Hathaway | 360/77 |
| 4,106,065 | 8/1978 | Ravizza | 360/109 |
| 4,151,569 | 4/1979 | Hathaway | 360/77 |
| 4,151,570 | 4/1979 | Ravizza et al. | 360/77 |
| 4,163,993 | 8/1979 | Ravizza | 360/77 |
| 4,165,523 | 8/1979 | Hathaway | 360/77 |
| 4,169,276 | 9/1979 | Rodal | 360/77 |

FOREIGN PATENT DOCUMENTS 2916895 10/1980 Fed. Rep. of Germany .
49-40414 4/1974 Japan .
56-20628 5/1981 Japan .

Primary Examiner—Robert S. Tupper
Attorney, Agent, or Firm—Cushman, Darby & Cushman

[57] ABSTRACT

A magnetic tape recording and reproducing apparatus includes a rotatable head drum having heads and inclined with respect to a reference plane, and a pair of movable guide poles movably located in first positions respectively upstream and downstream of the head drum in a direction of travel of a magnetic tape, for guiding the magnetic tape to be wrapped helically around the head drum in a wrapping range along a tape path inclined with respect to the reference plane to allow each of the heads to scan the magnetic tape along a scanning locus to form thereon a track inclined with respect to a longitudinal direction of the magnetic tape in a recording mode at a normal speed. In a fast-forward or fast-reverse playback mode, one of the tape guide poles is displaced along the reference plane and locked in a second position other than the first positions to change the wrapping range of the magnetic tape. The tape path is shifted so that the formed track on the magnetic tape will be brought into conformity with the scanning locus of each of the heads when the magnetic tape is transported at a higher speed in the playback mode.

4 Claims, 11 Drawing Figures

MAGNETIC TAPE RECORDING AND REPRODUCING APPARATUS WITH ROTATABLE DRUM HAVING INCLINED HEADS

BACKGROUND OF THE INVENTION

The present invention relates to a magnetic tape recording and reproducing apparatus, and more particularly to a magnetic tape recording and reproducing apparatus of the helical scan type for recording signals on and reproducing signals from a magnetic tape wound helically around a rotatable head drum having a head while the head is scanning the magnetic tape slightly obliquely with respect thereto.

Magnetic tape recording and reproducing apparatus of the helical scan type operate in a signal recording mode by rotating a head on a head drum slightly obliquely with respect to the longitudinal direction of a magnetic tape as it is fed along in a forward direction at a certain speed. As shown in FIG. 1 of the accompanying drawings, such helical scanning produces a video track 2 on a magnetic tape 1 at an angle $\theta$ with respect to the longitudinal direction of the magnetic tape 1. When the recorded signal is reproduced in a normal-speed mode, the scanning path of the rotating head coincides with the video track 2, and the signal can be reproduced properly without noise. However, when the recorded signal is reproduced in a so-called fast-forward mode while the tape 1 is running in the direction of the arrow $X_1$, the rotating head scans the tape 1 along a path 3 deviated from the video track 2. Similarly, when the signal reproduction is carried out in a fast-reverse mode during the travel of the tape 1 in the direction of the arrow $X_2$, the rotating head scans the tape 1 along a path 4 also deviated from the video track 2. The scanning paths 3, 4 are inclined at angles $\theta_1 (>\theta)$ and $\theta_2 (<\theta)$, respectively, with respect to the longitudinal direction of the tape 1. The rotating head thus scans the tape 1 across plural tracks 2, resulting in a tracking error which produces noise on the reproduced image. FIG. 1 shows the angles as being exaggerated, and the difference between the angle $\theta$ and the angle $\theta_1$ or $\theta_2$ is actually on the order of a fraction of degree.

Different attempts have been made to eliminate the noise caused by the tracking error in the high-speed playback modes. One such attempt has employed a piezoelectric device such as a bimorph cell as an attachment for a rotating head, the bimorph cell being curved upon application of a control voltage thereto for bringing the scanning path of the rotating head into conformity with the video track on the tape. According to another effort, tape guides for guiding the magnetic tape in positions located upstream and downstream of the head drum in the direction of travel of the tape are vertically displaced to change the lead angle of the tape with respect to the drum, so that the video track on the tape will be aligned with the scanning path of the rotating head.

The former arrangement has suffered problems in that the piezoelectric device is difficult to control and is expensive. The latter proposal has been disadavntagous since the vertical displacement of the running tape causes a tracking error at an audio control head. Another drawback is that one longitudinal edge of the tape is pushed against and folded by a flange of the tape guide near the capstan, reulting in a curled tape.

SUMMARY OF THE INVENTION

It is an object of the present invention to provide a magnetic tape recording and reproducing apparatus for reproducing noise-free signals from a magnetic tape when the tape travels at higher forward and reverse playback speeds than a normal playback speed.

According to the present invention, a magnetic tape is guided by a pair of tape guide members movably located in first positions respectively upstream and downstream of a head drum in a direction of travel of the magnetic tape, the head drum having heads and inclined with respect to a reference plane. The magnetic tape is caused by the tape guide members to be wrapped around the head drum in a wrapping range along a tape path inclined with respect to the reference plane in recording and playback modes at a normal speed. The magnetic tape is scanned along a scanning locus by each of the heads which forms on the tape a track inclined with respect to the longitudinal direction of the tape. In a playback mode at a higher speed, one of the tape guide members is displaced along the reference plane and is locked in a second position other than the first positions to change the wrapping range of the magnetic tape. The tape path is shifted so that the formed track on the magnetic tape will be brought into conformity with the scanning locus of each of the heads when the magnetic tape is transported at a higher speed in the playback mode.

BRIEF DESCRIPTION OF THE DRAWINGS

The present invention will be described in detail by way of illustrative example with reference to the accompanying drawings, in which.

DETAILED DESCRIPTION

Figure 2:
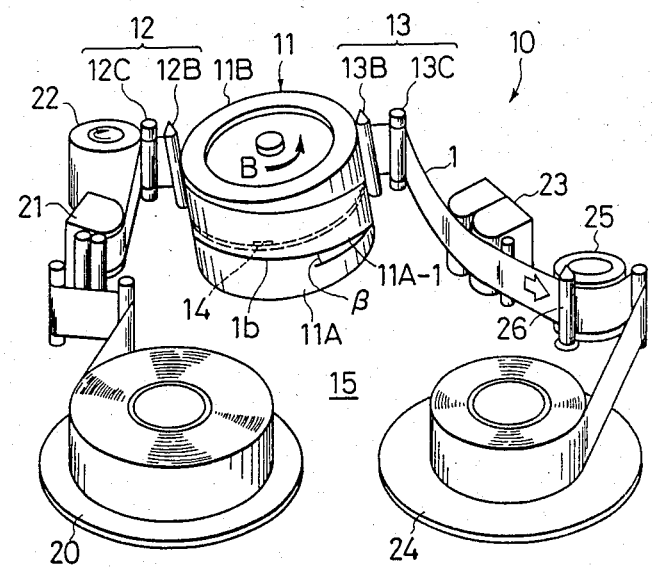
FIG. 2 is a perspective view of a magnetic tape recording and reproducing apparatus according to the present invention.
Figure 3:
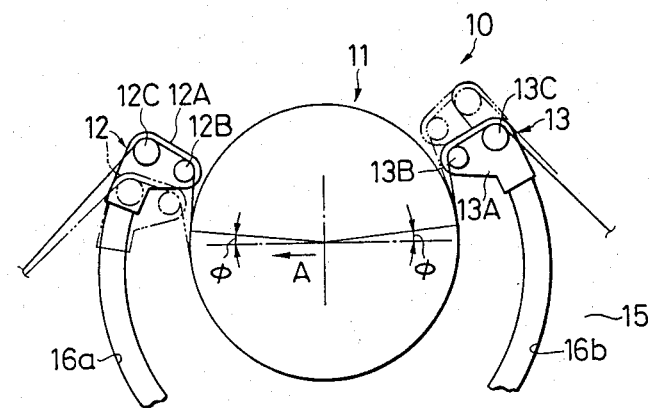
FIG. 3 is a plan view of a head drum and tape guide pole assemblies in the apparatus shown in FIG. 2.

As illustrated in FIGS. 2 and 3, a magnetic tape recording and reproducing apparatus 10 has a head drum 11 inclined at an angle in the direction of the arrow A with respect to a horizontal subchassis 15, a first tape guide pole assembly 12 disposed in a movable position located upstream of the head drum 11 in the direction of forward feed of a magnetic tape 1, and a second tape guide pole assembly 13 disposed in a movable position located downstream of the head drum 11 in the direction of forward feed of the magnetic tape 1.

The head drum 11 is composed of a lower fixed drum member 11A having a lead edge 11A-1 for guiding a lower longitudinal edge 1b of the magnetic tape 1, and an upper rotatable drum member 11B supporting heads 14 (only one shown) and rotatable about its own axis in the direction of the arrow B. The head 14 records signals along one track on the magnetic tape 1 for one field. The lower and upper drum members 11A, 11B are held in concentric relation to each other and have outer circumferential surfaces kept flush with each other. The magnetic tape 1 is wound helically around the lower and upper drum members 11A, 11B with the lower edge 1b of the tape 1 being guided by the lead edge 11A-1. The tape guide pole assemblies 12, 13 respectively comprise bases 12A, 13A, inclined guide poles 12B, 13B mounted on the bases 12A, 13A, and vertical flanged guide poles 12C, 13C mounted on the bases 12A, 13A. The tape guide poles assemblies 12, 13 are movable respectively in and along arcuate guide slots 16a, 16b defined in the horizontal subchassis 15 and extending partly around the head drum 11.

When the apparatus 10 is actuated to operate in a recording mode or a playback mode, the tape guide pole assemblies 12, 13 are moved horizontally in and along the arcuate guide slots 16a, 16b respectively to the positions shown in FIGS. 2 and 3. The magnetic tape 1 is unreeled from a supply reel 20, held against an erase head 21 and an impedance roller 22, wrapped around the outer circumferential surface of the head drum 11 through a wrapping range of 180°+2 $\phi$ defined by the inclined guide poles 12B, 13B, held against an audio/-control head assembly 23 and a pinch roller 25 and a capstan 26, and wound around a takeup reel 24. The magnetic tape 1 is fed along in such a tape path by the pinch roller 25 and the capstan 26 which sandwich and drive the tape 1. The tape path is formed along a horizontal reference plane H (FIGS. 4 and 5).

Figure 4:
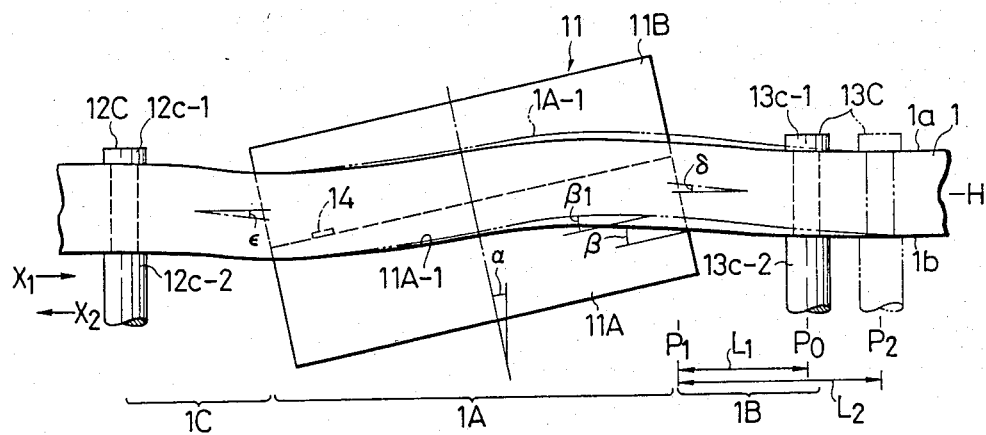
FIGS. 4 and 5 are developed views of tape paths extending through the head drum and tape guide poles and assumed in fast-forward and fast-reverse playback modes, respectively, in the apparatus of the present invention.
Figure 5:
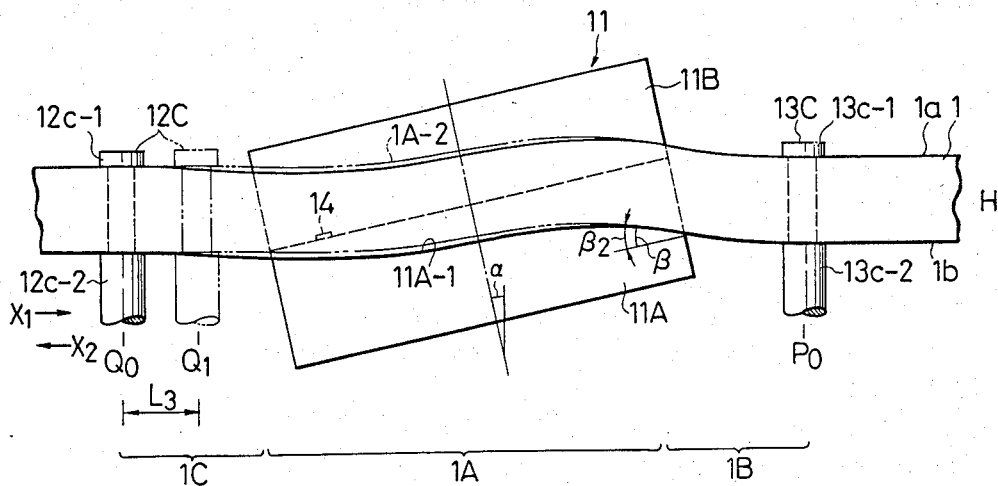

As shown in FIGS. 4 and 5, the tape path in the vicinity of the head drum 11 includes a tape path 1A extending around the head drum 11 and meandering in a somewhat S-shaped pattern in which the tape is set so as to approach the horizontal reference plane H as the wrapping range increases in the vicinity of an area where the tape leaves the head drum 11. The tape path also includes a downstream tape path 1B extending from the head drum 11 to the vertical guide pole 13C of the second guide pole assembly 13 and inclined downwardly at an angle $\delta$ with respect to the horizontal reference plane H, and an upstream tape path 1C extending from the vertical guide pole 12C of the first guide pole assembly 12 to the head drum 11 and inclined downwardly at an angle $\epsilon$ with respect to the horizontal reference plane H. By horizontally displacing the vertical guide poles 12C, 13C which are effective in limiting the vertical position of the tape 1, therefore, the angles $\delta$, $\epsilon$ are changed to vary a lead angle $\beta$ of the tape section 1A with respect to the head drum 11 in a manner described later. The angle $\delta$ can be expressed as follows:

$$\sin \delta = -(\cos \beta \sin \phi \sin \alpha + \sin \beta \cos \alpha)$$

where $\beta$ is the lead angle, $\phi$ the excess angle which is provided at each end of the wrapping range, and $\alpha$ the angle of inclination of the head drum 11. The excess angle provided at each end of the wrapping range makes a track little longer than one video field length to absorb possible head scanning errors.

Figure 1:
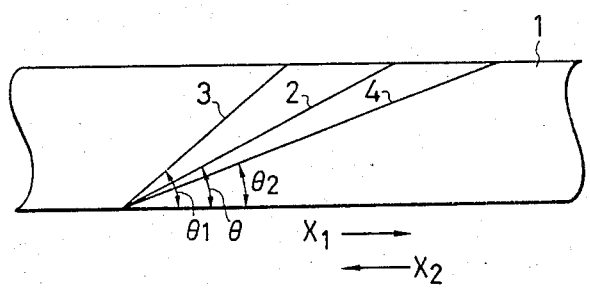
FIG. 1 is a fragmentary front elevational view of a magnetic tape, showing a video track on the magnetic tape and scanning paths of a rotating head in fast-forward and fast-reverse playback modes.

In a fast-forward playback mode, the second tape guide pole assembly 13 is angularly moved along the guide slot 16b to the position indicated by the two-dot-and-dash lines in FIG. 3 in a tape loading direction or in a direction to increase the wrapping angle of the magnetic tape 1 around the head drum 11. The movement of the tape guide pole assembly 13 causes the vertical guide pole 13C to move from a position P0 indicated by the solid lines in FIG. 4 to a position P2 indicated by the two-dot-and-dash lines in FIG. 4. At the same time, upper and lower flanges 13C-1, 13C-2 of the vertical guide pole 13C guide upper and lower edges 1a, 1b, respectively, of the magnetic tape 1 while keeping the tape height at the horizontal reference plane H. As the vertical guide pole 13C is thus moved, the distance from a position P1 where the magnetic tape 1 disengages from the head drum 11 to the position P2 where the magnetic tape 1 is caused by the vertical guide pole 13C to be kept at the horizontal reference plane H is increased from L1 to L2. The angle $\delta$ of downward inclination of the downstream tape path 1B is reduced in response to such a distance increase L2, with the result that the magnetic tape 1 is displaced upwardly in the position P0 where the vertical guide pole 13C was located prior to the movement to the position P2. Since the magnetic tape 1 has some rigidity in the direction of its plane, the magnetic tape 1 is also displaced upwardly in the position P1 due to the increase in the tape height in the position P0. Therefore, the magnetic tape 1 is now wound around the head drum 11 along a slightly higher tape path 1A-1 in which the lower edge 1b of the magnetic tape 1 is lifted off the lead edge 11A-1, whereupon the lead angle is reduced from $\beta$ to $\beta$1. The video track 2 (FIG. 1) on the magnetic tape 1 is now brought into alignment with the scanning path 3.

In the fast-forward playback mode, therefore, the magnetic tape 1 runs at a high speed over the circumferential surface of the head drum 11 in and along the tape path 1A-1 indicated by the two-dot-and-dash lines in FIG. 4. The head 14 scans the magnetic tape 1 along the video track 2 without crossing the same. Picture images reproduced are therefore free from undue noise which would otherwise be introduced by tracking errors.

The lead angle of the tape path around the head drum 11 becomes smaller as the distance of movement of the tape guide pole assembly 13 in the loading direction is greater. Therefore, the leading angle varies dependent on the distance for which the tape guide pole assembly 13 is moved. By appropriately determining the distance (L2−L1) of movement of the tape guide pole assembly 13 dependent on the tape speed, the video track 2 on the magnetic tape 1 can be brought into confirmity with the scanning path of the head 14. Consequently, pictures images free from noise can be reproduced irrespectively of the tape speed in the fast-forward playback mode.

In a fast-reverse playback mode, the first tape guide pole assembly 12 is angularly moved along the guide slot 16a to the position indicated by the two-dot-and-dash lines in FIG. 3 in a tape unloading direction or in a direction to reduce the angle through which the magnetic tape 1 is wound around the head drum 11. The movement of the tape guide pole assembly 12 causes the vertical guide pole 12C to move a distance L3 from a position Q0 indicated by the solid lines in FIG. 5 to a position Q1 indicated by the two-dot-and-dash lines in FIG. 5 while keeping the tape height at the horizontal reference plane H. Thus, the position in which the tape height is held at the horizontal reference plane H is moved from Q0 to Q1, approaching the head drum 11. With the upstream tape path 1A inclined downwardly, the magnetic tape 1 is displaced upwardly in the position Q1. Since the magnetic tape 1 has some rigidity in the direction of its plane, as described above, the magnetic tape 1 is also displaced upwardly in the position where it starts engaging the head drum 11. Therefore, the magnetic tape 1 is now wound around the head drum 11 along a slightly higher tape path 1A-2 in which the lower edge 1b of the magnetic tape 1 is lifted off the lead edge 11A-1, whereupon the lead angle is increased from $\beta$ to $\beta 2$. The video track 2 (FIG. 1) on the magnetic tape 1 is now brought into alignment with the scanning path 4.

In the fast-reverse playback mode, therefore, the magnetic tape 1 runs at a high speed over the circumferential surface of the head drum 11 in and along the tape path 1A-2 indicated by the two-dot-and-dash lines in FIG. 5. The head 14 scans the magnetic tape 1 along the video track 2 without crossing the same. Picture images reproduced are therefore free from undue noise due to tracking errors.

The lead angle of the tape path around the head drum 11 becomes smaller as the distance L3 of movement of the tape guide pole assembly 12 in the unloading direction is greater. Therefore, by appropriately determining the distance L3 of movement of the tape guide pole assembly 12 dependent on the tape speed, the video track 2 on the magnetic tape 1 can be brought into confirmity with the scanning path of the head 14. Consequently, pictures images free from noise can be reproduced irrespectively of the tape speed in the fast-reverse playback mode.

Even when the tape path 1A is varied in the above manner in the fast-forward or fast-reverse playback mode, the tape path sections located upstream and downstream of the tape guide pole assemblies 12, 13, respectively, are maintained at the horizontal reference plane H. Accordingly, no tracking error is caused on the audio control head 23 and no tape curling is produced by tape guides in the vicinity of the capstan 26.

Figure 6:
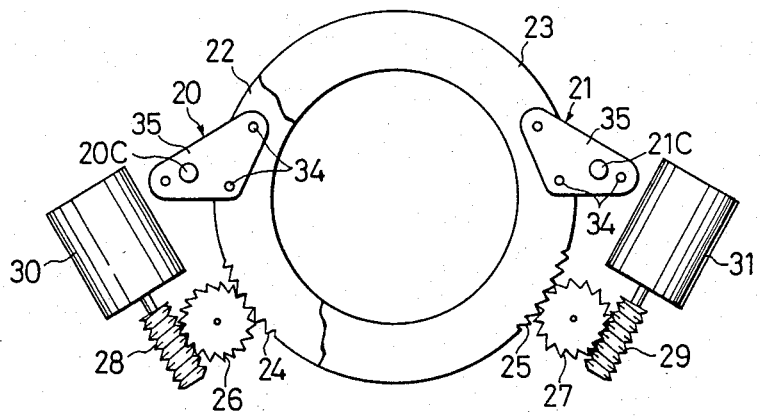
FIG. 6 is a plan view of mechanisms for moving tape guide pole assemblies.
Figure 7:
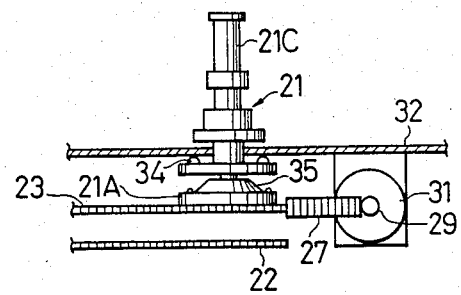
FIG. 7 is a side elevational view of one of the mechanisms shown in FIG. 6.
Figure 8:
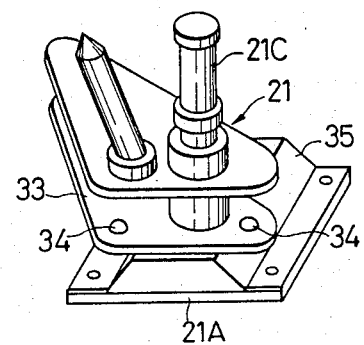
FIG. 8 is an enlarged perspective view of the mechanism of FIG. 7.

FIGS. 6 through 8 illustrate a mechanism for moving and locking each tape guide pole assembly to achieve the operation as illustrated in FIGS. 4 and 5. As shown in FIG. 6, a pair of tape guide pole assemblies 20, 21 located respectively upstream and downstream of the head drum in the direction of forward feed of the magnetic tape is mounted respectively on a pair of upper and lower annular loading gears 22, 23 disposed concentrically with each other and having external gear teeth 24, 25. The tape guide pole assemblies 20, 21 include bases 20A, 21A and vertical guide poles 20C, 21C mounted on the bases 20A, 21A, respectively, which are attached to the loading gears 22, 23. The external gear teeth 24, 25 are held in mesh with worm gears 26, 27 meshing with worms 28, 29, respectively, connected to output shafts of reversible stepping motors 30, 31, respectively, fixed to the lower surface of a subchassis 32 (FIG. 7). The loading gears 22, 23 and hence the tape guide poles 20C, 21C can be turned clockwise or counterclockwise through desired incremental angular intervals and then locked in desired angular positions by the stepping motors 30, 31, respectively. In the fast-forward playback mode, the stepping motor 31 is energized to move the vertical guide pole 21C to a desired angular position in response to application of a certain number of excitation pulses and is then de-energized to lock the vertical guide pole 21C in the desired angular position. In the fast-reverse playback mode, the stepping motor 30 is energized to move the vertical guide pole 20C to a desired angular position in response to application of a certain number of excitation pulses and is then de-energized to lock the vertical guide pole 20C in the desired angular position. The gear ratios between the worm gears 28, 29 and the worms 26, 27 and between the worms 26, 27 and the external gear teeth 24, 25 are large, the stepping motors 30, 31 will not be forcibly shifted out of their locked positions even when the vertical tape guide poles 20C, 21C are subjected to undue tape tension. Each of the tape guide pole assemblies 20, 21 includes a plate 33 supporting steel balls 34 embedded partly therein and urged by a leaf spring 35 into abutment against the lower surface of the subchassis 32. Therefore, the vertical tape guide poles 20C, 21C are securely positioned with respect to the subchassis 32 without being subjected to backlash. The mechanism shown in FIGS. 6 through 8 is advantageous in that it can perform incremental angular position adjustment of the vertical tape guide pole 20C or 21C.

Figure 9:
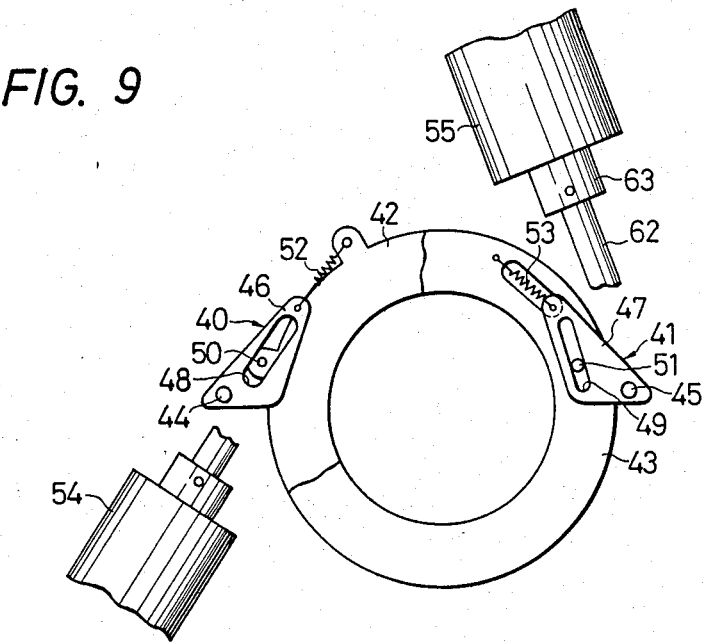
FIG. 9 is a plan view of mechanisms for moving tape guide pole assemblies according to another embodiment.
Figure 10:
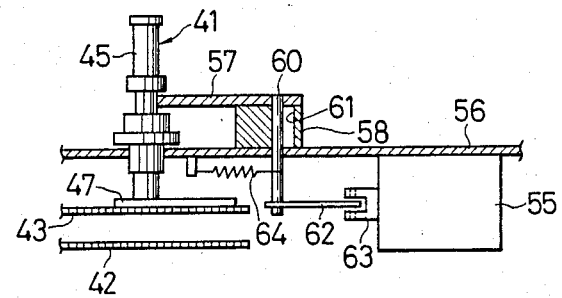
FIG. 10 is a side elevational view of one of the mechanisms illustrated in FIG. 9.
Figure 11:
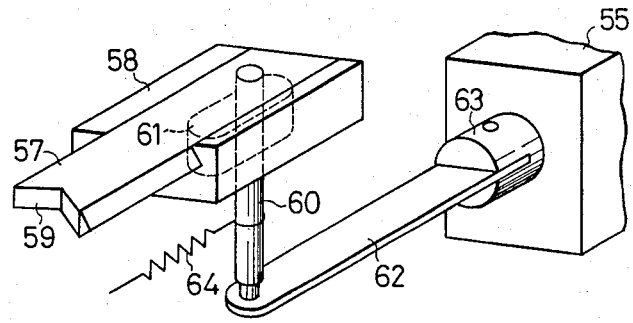
FIG. 11 is an enlarged perspective view of the mechanism of FIG. 9.

FIGS. 9 through 11 illustrate another mechanism for angularly positioning each of tape guide pole assemblies. Tape guide pole assemblies 40, 41 are mounted respectively on upper and lower concentric annular loading gears 42, 43 meshing with stepping motors through worm gear arrangments as shown in FIG. 6. The tape guide pole assemblies 40, 41 include vertical tape guide poles 44, 45 mounted on bases 46, 47 having slots 48, 49 in which pins 50, 51 on the bases 46, 47 are disposed. Springs 52, 53 act between the bases 46, 47 and the loading gears 42, 43. When the magnetic tape is loaded or wound around the head drum in a normal playback mode, the tape guide pole assemblies 40, 41 are positioned with the springs 52, 53 slightly tensioned.

A pair of solenoids 54, 55 are mounted on the lower surface of a subchassis 56 for moving and locking the vertical tape guide poles 44, 45 through respective positioning mechanisms. FIGS. 10 and 11 are illustrative of such a positioning mechanism for the vertical tape guide pole 45 only. Although not shown, the vertical tape guide pole 44 is also associated with an identical positioning mechanism. A positioning lever 57 is mounted by a stopper 58 on the subchassis 56 and has a V-shaped notch 59 defined in its distal end for engagement with the vertical tape guide pole 45. The positioning lever 57 is slidably disposed on the stopper 58 through a dovetail joint. To the positioning lever 57, there is fixed an upper end of a vertical pin 60 extending downwardly through a slot 61 defined in the stopper 58. The vertical pin 60 has a lower end coupled to an actuating bar 62 connected to a plunger 63 of the solenoid 55. The vertical pin 60 is normally urged by a spring 64 in a direction away from the solenoid 55.

When the recording and reproducing apparatus is in the normal playback mode, the vertical tape guide pole 45 is in the illustrated loading position in which the guide pole 45 is engaged by the positioning lever 57 held against a front end of the slot 61, as shown, under the bias of the spring 64. At this time, the spring 53 is under tension as described above. In the fast-forward playback mode, the solenoid 55 is energized to pull the actuating bar 42 until the vertical pin 60 engages a rear end of the slot 61 against the resiliency of the spring 64, whereupon the positioning lever 57 is retracted to cause the V-shaped notch 59 to disengage from the vertical tape guide pole 45. The vertical tape guide pole 45 is then moved counterclockwise (FIG. 9) under the force of the spring 53 in a direction to further load the magnetic tape for thereby achieving the operation as shown in FIG. 4. In the fast-reverse playback mode, the solenoid 54 is energized to turn the vertical tape guide pole 44 counterclockwise in a direction to unload the magnetic tape for thereby achieving the operation as shown in FIG. 5.

Since the solenoids 54, 55 do not provide incremental or continuous positional adjustment for the vertical tape guide poles 44, 45, the mechanism illustrated in FIGS. 9 through 11 is effective in playback modes with prescribed tape speeds.

Although certain preferred embodiments of the present invention have been shown and described in detail, it should be understood that various changes and modifications may be made therein without departing from the scope of the appended claims.

What is claimed is:

1. A magnetic tape recording and reproducing apparatus comprising:
    (a) a rotatable head drum having heads and inclined with respect to a reference plane;
    (b) a pair of movable tape guide members movably located in first positions respectively upstream and downstream of said head drum in a direction of travel of a magnetic tape, for guiding the magnetic tape to be wrapped helically around said head drum in a wrapping range along a tape path inclined with respect to said reference plane to allow each of said heads to scan said magnetic tape along a scanning locus to form thereon a track inclined with respect to a logitudinal direction of said magnetic tape in a recording mode;
    (c) means for transporting said magnetic tape at a first speed in said recording mode and at a second speed different from said first speed in a playback mode;
    (d) means for positioning said tape guide members in said first positions in said recording and playback modes; and
    (e) said positioning means including means for displacing along said reference plane one of the tape guide members and locking said one of the tape guide members in a second position other than said first positions to change said wrapping range of the magnetic tape, whereby said tape path is shifted so that said formed track on the magnetic tape will be brought into conformity with the scanning locus of each of said heads when said magnetic tape is transported at said second speed in the playback mode, wherein said positioning means comprises a pair of concentric annular loading gears supporting said tape guide members respectively thereon, a pair of motors, a pair of worms rotatable by said motors, and a pair of worm gears meshing with said worms and said loading gears.

2. A magnetic tape recording and reproducing apparatus according to claim 1, wherein said motors comprise stepping motors.

3. A magnetic tape recording and reproducing apparatus comprising:
    (a) a rotatable head drum having heads and inclined with respect to a reference plane;
    (b) a pair of movable tape guide members movably located in first positions respectively upstream and downstream of said head drum in a direction of travel of a magnetic tape, for guiding the magnetic tape to be wrapped helically around said head drum in a wrapping range along a tape path inclined with respect to said reference plane to allow each of said heads to scan said magnetic tape along a scanning locus to form thereon a track inclined with respect to a longitudinal direction of said magnetic tape in a recording mode;
    (c) means for transporting said magnetic tape at a first speed in said recording mode and at a second speed different from said first speed in a playback mode;
    (d) means for positioning said tape guide members in said first positions in said recording and playback modes; and
    (e) said positioning means including means for displacing along said reference plane one of the tape guide members and locking said one of the tape guide members in a second position other than said first positions to change said wrapping range of the magnetic tape, whereby said tape path is shifted so that said formed track on the magnetic tape will be brought into conformity with the scanning locus of each of said heads when said magnetic tape is transported at said second speed in the playback mode, wherein said displacing and locking means comprises a positioning lever normally engaging said one tape guide member to retain the same in said first position, a solenoid for actuating said positioning lever out of engagement with said one tape guide member, and a spring for urging said one tape guide member to move toward said second position when said solenoid is de-energized.

4. A magnetic tape recording and reproducing apparatus according to claim 3, wherein said displacing and locking means further includes a stopper on which said positioning lever is slidably mounted by a dovetail joint, said stopper having a slot defined therein, a pin extending through said slot and having one end connected to said positioning lever, and an actuating bar connected to an opposite end of said pin and to a plunger of said solenoid, said pin being engageable with one end of said slot when said positioning lever engages with said one tape guide member and with an opposite end of the slot when solenoid is energized.

* * * * *